United States Patent [19]
Hess et al.

[11] Patent Number: 5,104,959
[45] Date of Patent: Apr. 14, 1992

[54] POLYURETHANE-BASED REACTIVE ADHESIVES IN WHICH THE ISOCYANATE IS STABILIZED BY A POLYETHER AMINE

[75] Inventors: Heinrich Hess; Richard Kopp, both of Cologne; Gerhard Gröglerl, Leverkusen; Horst Stepanski, Leverkusen; Rudolf Hombach, Leverkusen; Walter Schäfer, Leichlingen, all of Fed. Rep. of Germany

[73] Assignee: Bayer Aktiengesellschaft, Leverkusen Bayerwerk, Fed. Rep. of Germany

[21] Appl. No.: 536,140

[22] Filed: Jun. 11, 1990

[30] Foreign Application Priority Data

Jun. 16, 1989 [DE] Fed. Rep. of Germany ....... 3919696

[51] Int. Cl.$^5$ ............................................. C08G 18/48
[52] U.S. Cl. ...................................... 528/79; 528/902; 528/905; 156/331.4; 156/331.7; 427/385.5
[58] Field of Search ......................... 528/79, 902, 905; 156/331.4, 331.7; 427/385.5

[56] References Cited

U.S. PATENT DOCUMENTS

| | | | |
|---|---|---|---|
| 4,331,778 | 5/1982 | Sommerfeld et al. | 521/129 |
| 4,400,497 | 8/1983 | Blum et al. | 528/45 |
| 4,525,570 | 6/1985 | Blum et al. | 528/75 |
| 4,595,445 | 6/1986 | Hombach et al. | 528/902 |
| 4,687,851 | 8/1987 | Laughner | 544/398 |
| 4,743,672 | 5/1988 | Goel | 528/44 |
| 4,767,836 | 8/1988 | Cuscurida et al. | 528/45 |
| 4,902,768 | 2/1990 | Gerkin et al. | 528/68 |
| 4,935,460 | 6/1990 | Cassidy et al. | 524/251 |

OTHER PUBLICATIONS

G. Oertel, "Polyurethane Handbook: Chemistry-Raw Materials-Processing-Applications-Properties", Hanser Publishers, New York, 1985, p. 47.

Primary Examiner—Maurice J. Welsh
Assistant Examiner—Rachel Johnson
Attorney, Agent, or Firm—Joseph C. Gil; Godfried R. Akorli

[57] ABSTRACT

The present invention is directed to a polyurethane-based reactive adhesive comprising A) at least one polyisocyanate, B) at least one polyol, and C) at least one polyamine C which is a polyether amine containing at least two amino groups, at least one phenyl group and recurring polyoxyalkylene units.

9 Claims, No Drawings

POLYURETHANE-BASED REACTIVE ADHESIVES IN WHICH THE ISOCYANATE IS STABILIZED BY A POLYETHER AMINE

BACKGROUND OF THE INVENTION

The present invention relates to polyurethane-based reactive adhesives and to their use as one-package adhesive systems.

Heat-curing one-component reactive adhesives based on solid, finely divided polyisocyanates stabilized by coating with polyadducts and isocyanate-reactive compounds, such as polyols and polyamines, are known in the patent literature (cf. for example European patents 62,780, 100,508 and 153,759 and German Auslegeschriften 3,112,054, 3,228,723 and 3,403,499). Hitherto, one of the problems involved in the formulation of heat-curing one-component polyurethane adhesives using such technology has been that adhesives such as these are required to combine high hardness with high heat resistance and a minimal isocyanate demand.

The problem addressed by the present invention was to provide improved polyurethane-based adhesive systems which are suitable for one-component adhesives.

DESCRIPTION OF THE INVENTION

The present invention relates to polyurethane-based reactive adhesives comprising A) at least one polyisocyanate, B) at least one polyol, C) at least one polyamine which is a polyether amine containing at least two amino groups, at least one phenyl group and recurring polyoxyalkylene units, and, D) optionally, standard additives.

In one preferred embodiment, the phenyl group in the polyether amine corresponds to the residue obtained after removal of two phenolic hydroxyl groups from one of the following compounds: hydroquinone, 4,4'-dihydroxydiphenyl, 4,4'-dihydroxydiphenyl methane, 2,2-bis-(4-hydroxyphenyl)-propane, 1,1-bis(4-hydroxyphenyl)-ethane, 1,1-bis-(4-hydroxy-phenyl)cyclopentane, 1,1-bis-(4-hdyroxyphenyl)-cyclohexane, 1,1-bis-(4-hydroxyphenyl)-3,3,5-trimethylcyclohexane, 4,4'-dihydroxystilbene, 4,4'-dihydroxytolane, 4,4'-dihydroxydiphenyl ether, 3,3'-dihydroxydiphenyl ether, 1,4-dihydroxy naphthalene, 1,5-dihydroxynaphthalene, 1,6-dihydroxynapthalene, 1,7-dihydroxynaphthalene, 2,6-dihydroxynaphthalene, 2,7-dihydroxynaphthalene, 1,4-bis-(2-hydroxyethoxy)-benzene, 1,5-bis(2-hydroxyethyethoxy)-naphthalene, and 2,2-bis-[4-(2-hydroxyethoxy)-phenyl]-propane.

In one particularly preferred embodiment, the polyether amine corresponds to the following general formula:

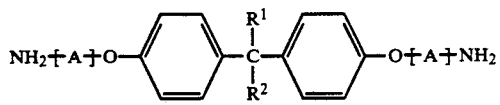

wherein A is an alkylene group which can be the same or different, which can be substituted with substituents are non-reactive with the components of the adhesive, and which is interrupted by oxygen atoms, and, $R^1$ and $R^2$ represent a $C_{1-6}$ alkyl radical, more particularly methyl, or, together with the C atoms connecting them, represent the residue for completing a carbocyclic ring, more especially containing 5 to 7 C atoms.

In one preferred embodiment, A is and is selected from recurring groups consisting of

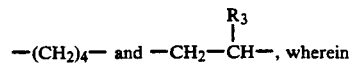

$R_3$ represents hydrogen and/or $C_{1-6}$ alkyl or $C_{3-6}$ cycloalkyl groups.
interrupted by oxygen atoms.

Especially preferred polyamines corresponds to the following formula

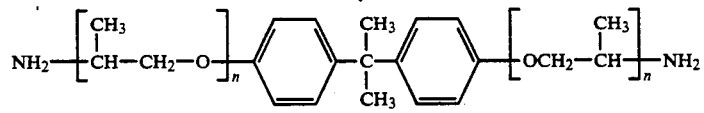

in which n=1 to 50 and preferably 3 to 15.

Preferred polyamines have molecular weights in the range from 400 to 6,000 and more preferably n the range from 600 to 3,000.

Preferred polyisocyanates A) have a melting point above 40° C. and preferably above 80° C. Examples include 1,5-naphthalene diisocyanate, dimeric 4,4'-diisocyanatodiphenyl methane, dimeric 2,4-diisocyanatotoluene, 3,3'-diisocyanato-4,4'-dimethyl-N,N'-diphenyl urea and N,N'-bis-[4-(4- or 2-isocyanatophenylmethyl)-phenyl]-urea. Dimeric 2,4-diisocyanatotoluene in particularly preferred.

The polyisocyanates are preferably stabilized by the action of, for example, aliphatic polyamines having molecular weights in the range from 32 to 399 and, optionally, by the action of aliphatic polyamines having molecular weights in the range from 400 to 8,000. Examples of such polyamines are ethylene diamine, 1-amino-3,3,5-trimethyl-5-aminomethylcyclohexane, 3,3'-dimethyl-4,4'-diaminodicyclohexyl methane, diethylenetriamine, methyl nonanediamine.

Other suitable stabilizers are, for example, hydrazine, generally in the form of hydrazine hydrate, $C_{1-6}$-alkyl-substituted hydrazines, for example methyl hydrazine, ethyl hydrazine, hydroxyethyl hydrazine or N,N'-dimethyl hydrazine, hydrazide-terminated compounds such as, for example, carbodihydrazide, ethylenebiscarbazinic ester, β-semicarbazidopropionic acid hydrazide or isophorone-bis-semicarbazide. Other deactivators are described in German Auslegeschriften 3,230,757 and 3,112,054 and in European patents 103,325 and 62,.780.

Open-chain monocyclic or bicyclic amidines and guanidines, which do not contain any isocyanate-reactive hydrogen atoms, may also be used as stabilizers for the isocyanate component. Examples of compounds such as these are tetramethyl guanidine, pentamethyl guanidine, 1,2-dimethyl tetrahydropyrimidine, 1,8-diazabicyclo-[5.4.0]-undec-7-ene, 1,5-diazabicyclo-[5.3.0]-non-5-ene. Further examples of amidines such as these are listed in German Auslegeschrift 3,403,500.

Suitable NCO-reactive suspension mediums for the solid, stabilized polyisocyanates are, for example, liquid low molecular weight and/or relatively high molecular weight polyols and/or polyamines.

Preferred polyols B) having molecular weights in the range from 400 to 10,000 are the polyesters, polyethers, polythioethers, polyacetals, polycarbonates and polyester amides containing at least two and preferably two to four hydroxyl groups and generally having a molecular weight in the range from 400 to 8,000, of the type generally known for the production of homogeneous and cellular polyurethanes. Examples of such polyols are described in detail, for example, in German Offenlegungsschriften 2,920,501, 2,854,384 and 3,230,757.

Polyhydroxyl compounds already containing urethane or urea groups and optionally modified natural polyols, such as castor oil, carbohydrates or starch, may also be used. Adducts of alkylene oxides with phenol-formaldehyde resins and with urea-formaldehyde resins are also suitable for use in the process according to the invention.

Polyhydroxyl compounds containing high molecular weight polyadducts or polycondensates or polymers in finely disperse or even dissolved form may also be used. Polyadduct-containing polyhydroxyl compounds are obtained by carrying out polyaddition reactions (for example reactions between polyisocyanates and amino-functional compounds) or polycondensation reactions (for example between formaldehyde and phenols and/or amines) in situ in the above-mentioned compounds containing hydroxyl groups.

Polyhydroxyl compounds modified by vinyl polymers, of the type obtained, for example, by polymerization of styrene and acrylonitrile in the presence of polyethers or polycarbonate polyols, are also suitable for the process according to the invention.

Representatives of these polyhydroxy compounds which may be used in accordance with the invention are described, for example, in High Polymers, Vol. XVI, "Polyurethanes, Chemistry and Technology", edited by Saunders-Frisch, Inter-science Publishers, New York, London, Vol. I, 1962, pages 32–42 and pages 44 and 54 and Vol. II, 1964, pages 5–6 and 198–199 and in Kunststoff-Handbuch, Vol. VII, Vieweg-Hochtlen, Carl-Hanser-Verlag, Munchen, 1966, for example on pages 45–71, and in DE-OS 2 854 384 and 2 920 501.

Other suitable polyols B) are polymers containing hydroxyl groups, for example copolymers of olefinically unsaturated monomers and olefinically unsaturated monomers containing active hydrogen. They are described, for example, in European patent 62,780. They are preferably used for sealing compounds, fillers, adhesives or undersealing compounds.

Mixtures of the above-mentioned compounds containing at least two hydroxyl groups, for example mixtures of polyethers and polyesters, may of course be used.

Other suitable additional polyols optionally present in the suspensions are low molecular weight chain-extending agents or crosslinking agents. These chain-extending agents or crosslinking agents are, in particular, at least difunctional compounds containing hydroxyl groups attached to aliphatic and/or cycloaliphatic groups and having molecular weights in the range from 62 to 399. Low molecular weight diols and triols containing hydroxyl groups attached to aliphatic or cycloaliphatic groups and having a molecular weight in the range from 62 to 399 are preferred. These compounds generally contain from 2 to 8, preferably from 2 to 4 and more preferably 2 hydroxyl groups. Mixtures of different compounds may of course also be used. Examples of such compounds are ethylene glycol, diethylene glycol, triethylene glycol, tetraethylene glycol, trimethylene glycol, butane-2,3-diol and/or butane-1,4-diol, pentane-1,5-diol, hexane-1,6-diol, neopentyl glycol, 1,4-bishydroxyethylcyclohexane, 1,4-dihydroxycyclohexane, terephthalic acid bis-(n-hydroxyethyl)-ester, 1,4,3,6-dianhydrohexitols, 1,4-monoanhydrotetritols, propylene glycol, dipropylene glycol, tripropylene glycol, tetrapropylene glycol, bis-2-hydroxyethyl hydroquinone, bis-(2-hydroxyethyl)-resorcinol. Suitable polyfunctional compounds are trimethylol propane, trmethylol ethane, hexane-1,2,6-triol, glycerol, pentaerythritol, quinitrol, mannitol, sorbitol, castor oil and also formose or formitol.

Tert.-amine-containing hydroxy functional materials, for example N-methyl diethanolamine, triethanolamine or N,N'-bis-hydroxyethyl piperizine are also suitable. It is also possible to use diols containing additional groups, for example adipic acid bis-(2-hydroxyethyl)-ester, terephthalic acid bis-(2-hydroxyethyl)-ester, diol urethanes, diol ureas or polyols containing sulfonate and/or phosphate groups, for example 1,6-hexamethylene bis-(2-hydroxy-ethyl urethane), 4,4'-diphenylmethane bis-(2-hydroxyethyl urea), or the adduct of Na bisulfite with butane-1,4-diol or alkoxylation products thereof. Other low molecular weight compounds are described in detail in German Auslegeschrift 2,854,384.

The low molecular weight and relatively high molecular weight polyols mentioned above may optionally be modified by preliminary reaction with a substoichiometric quantity of polyisocyanate. Polyisocyanates suitable for this purpose are aliphatic, cycloaliphatic, araliphatic, aromatic and/or heterocyclic polyisocyanates of the type described, for example, in German Offenlegungsschrift 2,920,501. Particularly preferred polyisocyanates are, in general, the commercially readily obtainable polyisocyanates, for example 2,4- and 2,6-tolylene diisocyanate and mixtures of these isomers ("TDI") polyphenyl-polymethylene polyisocyanates of the type obtained by phosgenation of aniline-formaldehyde condensates ("crude MDI"), 4,4'- and/or 2,4'-diphenylmethane diisocyanate, 1,6-hexamethylene diisocyanate, 1-isocyanato-3,3,5-trimethyl-5-isocyanatomethyl cyclohexane, perhydro-2,4'- and/or -4,4'-diphenylmethane diisocyanate.

The polyether amines C) to be used in accordance with the invention are prepared, for example, by the reductive amination of hydroxyl-terminated polyethers, as described in U.S. Pat. No. 3,654,370 or European patent 0 017 651. Starting compounds for such hydroxy-terminated polyethers are cyclic oxides, of which the polymerization is initiated by a compound containing hydroxyl, primary or secondary amino, amide or carboxyl groups. Suitable cyclic oxides are, for example, ethylene oxide, propylene oxide and tetrahydrofuran.

Other normally liquid, low molecular weight and/or relatively high molecular weight, aromatic and/or aliphatic polyamines, particularly those having molecular weights in the range from 700 to 4,500, may also be used. Relatively high molecular weight aliphatic polyamines, optionally containing small quantities of low molecular weight aliphatic polyamines, are preferred.

In addition, it is possible to use low molecular weight chain-extending agents D), more especially low molecular weight aromatic diamines having molecular weights in the range from 108 to 399, in which the amino groups are also attached to heterocyclic radicals of aromatic character.

Standard polyurethane catalysts may optionally be used. Tertiary amines or metal catalysts may be used with particularly good effect. Examples of such catalysts are, for example, tertiary amines, such as triethyl amine, tributyl amine, N,N,N',N'-tetramethyl ethylene diamine, 1,4-diazabicyclo-(2,2,2)-octane, N,N-dimethyl benzylamine, N,N-dimethyl cyclohexyl amine.

Organometallic compounds suitable as catalysts are, in particular, organic tin compounds and lead compounds. Preferred organotin compounds are tin(II) salts of carboxylic acids, such as tin (I) ethyl hexoate and tin(II) stearate, and the dialkyl tin salts of carboxylic acids, such as for example dibutyl tin dilaurate or dioctyl tin diacetate. Preferred organolead compounds are lead (II) salts of carboxylic acids, such as lead(II) naphthenate, lead(II) ethyl hexoate, lead(II) stearate and also, for example, lead(I)-bis-diethyl dithiocarbamate.

Other representatives of catalysts suitable for use in accordance with the invention and information on the mode of action of the catalysts can be found in Kunststoff-Handbuch, Vol. VII, edited by Vieweg and Hochtlen, Carl-Hanser-Verlag, Munchen 1966, for example on pages 96–102, and in German Auslegeschrift 3,230,757.

The catalysts are generally used in a quantity of from about 0.001 to 10% by weight, based on the composition as a whole.

Suitable auxiliaries and additives which may optionally be present are dyes or pigments, fillers, such as heavy spar, chalk, quartz powder, kieselguhr, silica gel, precipitated silicas, fumed silicas, gypsum, talcum, active carbon, carbon black, metal powders. It is also possible to use reaction retarders, for example compounds showing an acidic reaction, such as hydrochloric acid, organic acid halides or organic acids; flameproofing agents known per se for example trischloroethyl phosphate or ammonium phosphate and polyphosphate; stabilizers against the effects of ageing and weathering, such as phenolic antioxidants and light stabilizers; plasticizers and fungistatic and/or bacteriostatic agents.

Examples and particulars of the use of such additives and their mode of action can be found in Kunststoff-Handbuch, Vol. VI, edited by Vieweg and Höchtlen, Carl-Hanser-Verlag, Munchen 1966, for example pages 103–113 and in German Auslegeschriften 2,854,384 and 2,920,501.

Reactive polyurethane adhesive mixtures more or less viscous at room temperature are obtained, depending on the viscosity of the starting components and the type and quantity of fillers used. These reactive adhesive mixtures are suspensions of a solid polyisocyanate stabilized by coating with polyadducts in the polyol and polyamine component. These mixtures are hardened by the effect of heat. The processing of the systems according to the invention is determined by their character and by the particular practical problem to be solved. They may be applied, for example, by hand or by a suitable extruding or spreading tool, for example in the form of a cartridge or a coating knife, to the materials to be bonded, for example articles of bare or pretreated metal, glass, glazed ceramics or plastics, which may even be reinforced, for example, by glass fibers.

In the following Examples, quantities are in parts by weight, unless otherwise indicated.

EXAMPLES

EXAMPLE 1

The differences in the mechanical values where a pure polypropylene ether diamine is replaced by a propylene ether diamine according to the invention initiated by 2,2-bis-(4-hydroxyphenyl)-propane instead of propylene glycol (as in German Auslegeschrift 3,403,499) are shown in the following:

|  | Thickening temp. | Hardness after hardening for ½ h at 120° C. | |
|---|---|---|---|
|  |  | Shore A | Shore D |
| Mixture A consisting of 100 parts by weight of a polyoxypropylene ether diamine, molecular weight 1,000, and 38.28 parts by weight 2,4-diisocyanato-toluene dimerized by uretdione formation | 110° C. | 83 | 24 |
| Mixture B consisting of 100 parts by weight of a 2,2-bis-(4-hydroxyphenyl)-propane-initiated polyoxypropylene ether diamine, molecular weight 1,000, and 38.28 parts by weight 2 4-diisocyanatotoluene dimerized by uretdione formation | 90° C. | 93 | 45 |

EXAMPLE 2

71 Parts by weight Desmodur TT and 10 parts by weight Aerosil R 202 are uniformly stirred by means of a highspeed stirrer into a mixture of 63.75 parts by weight of a 2,2-bis-(4-hydroxyphenyl)-propane-initiated polyoxypropylene ether diamine having a molecular weight of 1,000, 36.25 parts by weight of a trimethylolpropane-initiated polyoxypropylene ether triol having an average molecular weight of 450, 0.1 part by weight 4,4'-diamino-3,3'-dimethyl cyclohexyl methane, 0.3 part by weight Pb octoate ("Octa Soligen Pb 24", a product of the Borchers company), and 0.2 part by weight of a 33% solution of triethylene diamine ("DABCO") in dipropylene glycol. The mixture is then degassed by application of a vacuum. A readily spreadable adhesive paste having a thickening temperature of 80° C. is obtained. A slightly foamed, hard mass is obtained after hardening at 120° C. Testing of the adhesive on SMC produces a tensile shear strength of 10.0N/mm2.

EXAMPLE 3

32.76 Parts by weight of a naphthylene-1,5-diisocyanate finely ground in a jet mill and 10 parts by weight Aerosil R 202 are uniformly stirred by means of a highspeed stirrer into a mixture of 88.3 parts by weight of a 2,2-bis-(4-hydroxyphenyl)-propane-initiated polyoxypropylene ether diamine having a molecular weight of 1,000, 11.7 parts by weight of a trimethylol-propane-initiated polyoxypropylene ether triol having an average molecular weight of 260 and 1.5 parts by weight 4,4'-diamino-3,3'-dimethyl dicyclohexyl methane. The mixture is then degassed by application of a vacuum. A readily spreadable adhesive paste having a thickening temperature of 71° C. is obtained. A hardness of 92 Shore A is measured after hardening at 120° C. SMC test specimens bonded for 10 minutes at 120° C. have a tensile shear strength of 7.0N/mm2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane-based reactive adhesive comprising A) at least one polyisocyanate, B) at least one polyol, and C) at least one polyamine C which is a polyether amine containing at least two amino groups, at least one phenyl group and recurring polyoxyalkylene units.

2. The reactive adhesive of claim 1, wherein the phenyl group of the polyamine is obtainable by removal of two phenolic OH groups from a compound selected from the group consisting of 2,2-bis-(4-hydroxyphenyl)-propane, 1,1-bis-(4-hydroxyphenyl)-3,3,5-trimethyl cyclohexane, and 1,4-bis-(2-hydroxyethoxy) benzene.

3. The reactive adhesive of claim 1 wherein the polyether amine C) corresponds to the following general formula

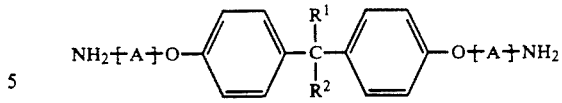

wherein A represents an optionally substituted chain of optionally different alkylenes interrupted by O atoms, and $R^1$ and $R^2$ represents a $C_{1-6}$ alkyl radical, or, together with the C atoms connecting them, represent the residue for completing a carbocyclic ring.

4. The reactive adhesive of claim 1 wherein the polyether amine corresponds to the following formula

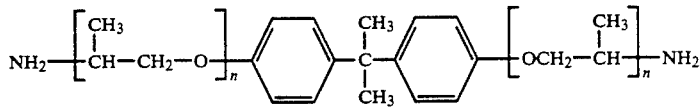

with $n = 1-50$.

5. The reactive adhesive of claim 1 wherein the polyether amine has a molecular weight in the range from 400 to 6,000.

6. The reactive adhesive of claim 1 wherein the polyisocyanate is selected from the group consisting of 1,5-naphthalene diisocyanate, dimeric 4,4'-diisocyanatodiphenyl methane, dimeric 2,4-diisocyanatotoluene, 3,3'-diisocyanato-4,4'-dimethyl-N,N'-diphenyl urea and N,N'-bis-[4-(4- or 2-isocyanatophenylmethyl)-phenyl]-urea.

7. The reactive adhesive of claim 1 wherein the polyol B) has a molecular weight in the range from 400 to 10,000.

8. The reactive adhesive of claim 1 containing from 0.2 to 1 mol of B) and 0.1 to 1 mol of C) per mol of A).

9. In a process for the bonding of substrates comprising applying an adhesive to at least one of the surfaces to be joined, bringing the surfaces to be joined together, and allowing the adhesive to fully cure, the improvement wherein the adhesive is the adhesive of claim 1.

* * * * *